Patented Feb. 16, 1954

2,669,553

UNITED STATES PATENT OFFICE 2,669,553

COPOLYMER OF A DIOLEFINE AND A KETONE

Gerson S. Schaffel, Cuyahoga Falls, and Kermit V. Weinstock, Akron, Ohio, assignors to The General Tire and Rubber Company, Akron, Ohio, a corporation of Ohio No Drawing. Application August 19, 1949, Serial No. 111,344

24 Claims. (Cl. 260—41.5)

This invention relates to curable or thermosetting resinous and rubberlike compositions, to a method of preparing such compositions, and to articles prepared therefrom. It particularly relates to rubbery and resinous compositions which may be cured or changed from the soluble to the insoluble state and which have in their cured state excellent aging properties.

It is now generally recognized that plastic and thermoplastic properties in resins or rubbers are associated with noncrosslinked or relatively noncrosslinked molecules which are extremely large and are held together only by secondary forces. When a thermoplastic and soluble material is changed to the nonthermoplastic and insoluble state, it is generally recognized that a chemical bridging or crosslinking of the molecules occurs so that they form an interlocking network that cannot be separated by solvent action, etc. In the rubbery materials of the prior art this has generally been accomplished by vulcanizing agents such as sulfur, a single molecule of which may combine with two or more polymer molecules that have substantial chemical unsaturation to form a bridge in a cured or thermoset product.

Rubber articles, for example, vulcanized with sulfur have some undesirable properties. The hot tensile strength for example is considerably less than is desired in many instances. The flexing and tensile strength after aging for substantial periods usually becomes deteriorated to a very substantial degree. Because of these undesirable properties in the case of sulfur-vulcanized polymeric materials, many attempts have been made to substitute other vulcanizing agents for sulfur. Certain organic peroxides, bifunctional phenyl compounds, etc. have been proposed, but as far as applicants are aware none of these has been anywhere nearly as successful as sulfur in the vulcanization of thermoplastic or plastic materials.

It is an object of the present invention to provide rubberlike and resinous compounds which may be converted from the plastic or thermoplastic to the vulcanized or thermosetting state without sulfur, and which in the vulcanized state have properties that are superior in many respects to articles vulcanized with sulfur.

Another object of the present invention is to provide vulcanized rubbery and resinous materials which are able to withstand prolonged exposure to curing temperatures without deterioration.

A further object is to provide a process of preparing vulcanized elastomers having exceptional aging properties.

We have found that rubbery plastic copolymers of one or more conjugated diolefinic compounds with one or more olefinic compounds having a grouping with an active hydrogen may be cured or converted into the thermoset from the thermoplastic state by the reaction with aldehydes, and particularly by reaction with formaldehyde and compounds which at elevated temperatures are capable of liberating formaldehyde, an active methylene group or formaldehyde radical. Hydrogens on a carbon alpha to a carbonyl group are particularly affected by such aldehyde compounds. The aldehyde or aldehyde-producing compound may be integrally mixed with the solid rubbery polymeric compounds and the curing reaction is accelerated by elevated temperatures and by contact with a catalytic material such as an acid.

The reaction or curing operation may be accomplished with the aid of heat and pressure, as by heating a mixture of one or more of the high polymers containing active hydrogen in a suitable mold or press, such as is used in the rubber and plastic industries. The cured or reacted polymers are found to have excellent and in fact almost phenomenal physical properties. The polymers, particularly the copolymers of diolefinic compounds such as butadiene with the mono-olefinic compounds containing an active hydrogen for reaction with formaldehyde, when cured with formaldehyde are exceptionally resistant to high temperature deterioration and have exceptionally low hysteresis loss. They are superior in these respects to any rubbery material of which we are aware.

The active hydrogen for reaction with an aldehyde is present in high copolymers of a conjugated diolefine or diolefinic compound with a copolymerizable olefinic compound having the grouping

where R' is selected from the group consisting of hydrogen and aryl and alkyl groups (preferredly aliphatic groups having hydrogen on a carbon atom alpha to the carbonyl group), and R is a carbon atom and is an aliphatic carbon atom having hydrogen connected directly thereto in all cases where R' is hydrogen or contains, alpha to the carbonyl group, no aliphatic carbon atom directly carrying a hydrogen. Ketone-containing compounds, i. e. compounds wherein R' is an alkyl group, such as methyl or ethyl, containing hydrogen directly connected to the carbon atom adjacent the carbonyl group, are especially desirable and give the most outstanding properties when cured with an aldehyde such as formaldehyde in accordance with the present invention.

The carbon-oxygen double bond is usually in conjugated relation with a carbon-to-carbon double bond of the monomeric material entering into the polymer and may serve as an activator for these bonds. It is unnecessary that such carbon-to-carbon bond be a double bond removed in the polymerization process as aromatic double bonds which do not undergo change by free radical polymerization also function in accordance with the present invention. Polymers without a double bond cure in accordance with the present invention.

The present invention is particularly concerned with the curing of rubbery copolymers without the necessity of sulfur. Rubbery copolymers generally have a substantial or major portion of one or more interpolymerized conjugated dienes or polymerizable diolefinic compounds of four to nine aliphatic carbon atoms and consisting solely of elements selected from hydrogen, carbon, nitrogen and chlorine. The diolefines (hydrocarbons) of 4 to 9 aliphatic carbon atoms are generally preferred. The polymers are prepared by polymerizing (usually while emulsified in aqueous solution of soap or protective colloid, or both) with the aid of a free radical-producing catalyst, a mixture of one or more compounds having a hydrogen on an alpha carbon activated by a carbonyl group and one or more of the polymerizable conjugated diolefinic compounds, such for example as butadiene-1,3, isoprene, 2,3-dimethylbutadiene, 1-cyanobutadiene-1,3, 2-cyanobutadiene-1,3, chloroprene, etc.

The total diolefinic compound should ordinarily be present in amounts greater than 40 or 45% of the total copolymerizable materials and 70 to 85% of diolefine or diolefinic compound is usually present. Up to 90%, or even 95% of diolefine or diolefinic compound may however be present while still permitting the formation of a product curable by the process of the present invention. Rubbery materials may, however, also be prepared by copolymerizing at extremely low temperatures with the aid of a Friedel-Crafts catalyst such as a boron fluoride complex a compound containing the aforementioned aldehyde or ketone group with mono-olefinic compounds, such for example as isobutylene. Such rubbery materials are also cureable by the mechanism of the present invention.

The polymerizable or copolymerizable compounds containing the above described grouping with active hydrogen, i. e. aldehyde or ketone grouping have hydrogen on a carbon alpha to the carbonyl group, should constitute at least 4 or 5% of copolymerizable monomers and 15 to 30% or more is preferred for a tight cure. When it is desired to produce a harder resinous material, curable with formaldehyde, hexamethylene tetramine, etc., and the carbonyl-containing monomer forms a hard homo-polymer, it may constitute a larger proportion of the monomeric materials.

Examples of monomeric materials containing the ketone or aldehyde grouping aforementioned include the unsaturated aldehydes and lower ketones having the unsaturated or olefinic group in conjugated relation to the oxygen of the ketone group and preferably having one methyl or ethyl group. They have the general formula

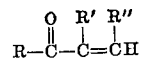

where R is hydrogen or lower alkyl and R' and R'' are selected from hydrogen, aryl and alkyl (preferredly lower alkyls, such as methyl, ethyl, etc. having less than four carbon atoms), R' being hydrogen in all cases when R is hydrogen or aryl or has alpha to the carbonyl a carbon atom that does not carry hydrogen directly attached thereto, i. e. when R contains no active hydrogen on a carbon atom alpha to the carbonyl group.

In order to readily prepare free radical copolymers, at least one of R and R' should be alkyl. These unsaturated aldehydes and ketones include (a) the olefinic ketones, such as methyl-isopropenylketone, methyl-vinylketone, having the general formula

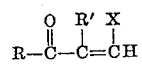

where X and R' are independently hydrogen or methyl, and R is a lower alkyl, including methyl, ethyl, propyl and butyl, and other alkyl groups of up to eight or nine carbon atoms and having hydrogen adjacent the carbonyl in all cases where R' is methyl, as well as (b) the olefinic aldehydes, such for example as acrolein, croton aldehyde, etc. having the general formula

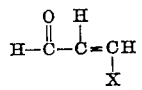

where X is hydrogen or alkyl, preferably methyl. These olefinic aldehydes are exceedingly hard to copolymerize with butadiene and most monomeric materials by the free radical mechanism and hence are not nearly as desirable as are the olefinic ketones (particularly those having two to four carbon atoms in the olefinic group, i. e. on the olefinic side of the carbonyl and one to four carbon atoms in the alkyl group on the other side of the carbonyl).

Other examples of these monomeric materials are nuclear acetyl styrenes, including para-acetyl styrene and nuclear acetyl alpha-methylstyrenes having nuclear positions adjacent the carbon carrying isopropenyl groups free of substituents, i. e. attached to hydrogen, and including para-acetyl-alpha-methylstyrene, etc. In case the polymer is formed by an acid (Friedel-Crafts) catalyst, such as aluminum chloride, it is unnecessary that these ortho positions be unsubstituted.

Comonomers may also be present with the diolefinic compound and ketone or aldehyde to modify the properties of the copolymer. Examples of such compounds are the acrylic esters and nitriles, such as acrylonitrile, methyl and ethyl acrylate, and higher acrylates, and corresponding methacrylic compounds, styrene, alpha-methylstyrene, dimethyl vinyl ethynyl carbinol, etc.

The curing agent may be incorporated into the polymer at any convenient time. It is preferably incorporated into the solid rubber by mastication as by milling on a rubber mill or in a mixer such as a Banbury mixer.

The curing is accomplished with the aid of heat and pressure. The time of cure is dependent on the temperature and the catalyst present. Without catalyst or with insufficient catalyst the curing operation may require as much as twelve or fourteen hours at around 300° F., shorter cures being possible at higher temperatures in accordance with the recognized law of chemical reactions. With acidic catalyst, as hereinafter described, the curing operation usually occurs in less than one hour at about 200° C. Somewhat higher elevated temperatures are generally used than are permissible with most synthetic rubbers because of the outstanding stability of the compounded copolymers.

While aldehydes, and particularly aliphatic aldehydes, act to some extent in the curing of the above-designated high polymers and copolymers, high polymers containing aldehyde groups and the lower aliphatic aldehydes having four carbon atoms or less are more desirable, and of the aldehydes that are not also high polymers formaldehyde and formaldehyde-producing materials, such as paraformaldehyde, trioxane and the like which liberate formaldehyde or formaldehyde radicals at elevated temperatures, are outstanding curing agents. This is probably for the reason that there is less stearic hindrance in the curing of the reaction when the number of carbon atoms is relatively low. The time for optimum cure appears to increase as one goes from formaldehyde through acetaldehyde to butyraldehyde, etc.

High polymers containing an aldehyde group are also excellent curing agents, apparently for the reason that only a single molecule need react further with an aldehyde group to give the crosslinking effect, whereas in the case of aldehydes which are not high polymers a single aldehyde must necessarily bridge across two molecules for the crosslinking effect. Thus, the polymers and copolymers of acrolein and crotonaldehyde, for example a copolymer of butadiene and methacrolein, is an excellent curing agent for a rubbery copolymer containing an active hydrogen on a carbon alpha to the carbonyl group. Such for example is a copolymer of butadiene and methyl-isopropenyl-ketone, or of butadiene and methylvinylketone, etc. The aldehyde for crosslinking or curing of the polymer molecules need not even be a separate compound from the polymer, as we have found that copolymers containing an active hydrogen and an aldehyde are readily cured by heating in the presence of a suitable catalyst, such as an acid medium. Thus, copolymers of butadiene and methyl-isopropenylketone, and methacrolein, for example, will cure or crosslink to the nonplastic state by simply heating them in the presence of an acid catalyst. Similarly, a copolymer having the active hydrogen in a pyridine group, for example, the copolymer of butadiene, methacrolein and vinyl pyridine, cures readily under acid conditions at elevated temperatures. Also, and surprisingly, the copolymer of butadiene, methyl-isopropenylketone and vinyl pyridine has been found to cure at elevated temperatures in the presence of an acid catalyst. Even without the presence of an acidic catalyst, cure may be experienced by substantially prolonged heating of these terpolymers at temperatures in the neighborhood of 250 to 450° F.

Compounds like hexamethylene tetramine which liberate formaldehyde and also liberate amines give an exceedingly rapid cure to the rubbery copolymers with which the present invention is concerned. However, the curing appears to be due in some slight part to the amine or ammonia-like materials given off by hexamethylene tetramine as well as to the formaldehyde liberated. For most commercial applications, the cure with hexamethylene is highly satisfactory, and is far superior to amine cures.

Rubbery polymers and copolymers as above-designated, however, when cured in the presence of an active nitrogenous base, as is present as a decomposition product of hexamethylene tetramine, break down at highly elevated temperatures much more readily than do polymers cured in the presence of formaldehyde but in the absence of appreciable amounts of reactive (primary or secondary) amine or ammonia, or other nitrogenous base containing a hydrogen on the nitrogen group thereof. This breakdown appears to be accentuated with extreme flexing of a block of solid rubber, such as is obtained on a Goodrich flexometer, at temperatures of 212° F. or higher. Polymers cured with primary or secondary amines alone are destroyed with great rapidity when flexed at elevated temperatures. Compounded polymers when cured with formaldehyde in part and ammonia or amines in part last many times as long but still break down in a relatively short time compared with compounds cured with formaldehyde and aldehydes alone or in the absence of active amines, or at least in the absence of sufficient amines or ammonia to greatly affect the cure. These latter have been flexed for great lengths of time at highly elevated temperatures, such as 212° F., without exhibiting any appreciable or noticeable change in physical properties, i. e. without any noticeable permanent set and no noticeable deterioration. In fact, compounds cured with paraformaldehyde, or trioxane for example, and compounded with a carbon black such as channel black, or a fine furnace black to provide a tensile strength of over 3000 pounds, have been flexed at highly elevated temperatures destructive to every known organic base rubbery material of which we are aware without any noticeable deterioration.

The presence of a catalyst to accelerate the reaction of the aldehyde with an active hydrogen, such as the active hydrogen of the polymer, is usually required to obtain a curing rate sufficiently rapid for most industrial operations. Acidic materials accelerate such a reaction. We have found that the presence of acidic materials, such for example as an organic acid, an organic ester which may hydrolyze to some extent to produce acids at curing temperatures, or acidic pigment such as channel black or the like, is especially desirable with formaldehyde cures. An acid substance is also often required in order to produce a good duplicable cure with hexamethylene tetramine. The combination with one or more of paraformaldehyde, hexamethylene, tetramine, trioxane, and a suitable catalyst, such as an acidic substance which provides a pH of less than 7 at curing temperatures, is therefore preferred. The acidic substance may be organic or inorganic and a part of or separate from the polymer. Organic materials which in the presence of water are acids or acidic are desired for the reason that they are somewhat more compatible with the polymeric materials. Examples of such materials are salicylic acid, benzene and toluene sulfonic acids, their anhydrides and acid chlorides, mono and dialkyl esters of phosphoric acid, etc. Even stearic acid is somewhat effective although less effective than are organic acids of less than 10 carbon atoms. In the case of acrylic ester copolymers, etc., the acidic substance is part of the polymer and is produced by hydrolysis or breakdown of the ester group.

Nitrogenous organic bases and ammonia which contain amino hydrogen are reactive by themselves with the preferred polymers and copolymers and hence are not as desirable catalysts as are the organic acids.

The following examples, in which parts are by weight, illustrate the present invention:

Example 1

A copolymer of butadiene and methyl-isopropenylketone is prepared in an aqueous emulsion by polymerizing these ingredients in the following proportions:

| | Parts |
|---|---|
| Butadiene | 75 |
| Methyl-isopropenylketone | 25 |
| Water | 180 |
| Sodium stearate | 5 |
| Potassium persulfate | .2 |
| MTM4 (mixture of 4 tertiary alkyl mercaptans having 12 to 16 carbon atoms) | .5 |

The above materials are incorporated in an enclosed autoclave equipped for agitation and for maintaining pressure and temperature, and agitated at 25° C. to 35° C. for eight and one-half hours, at which time the polymerization had progressed to about 70% of that theoretically possible. Thereupon the contents are removed, the butadiene and excess monomers flashed off, and the resulting latex coagulated by the addition of salt and sulfuric acid. The coagulum is dried in a manner identical to that used in preparing the GR–S (which is a trade name for copolymers of butadiene and styrene) manufactured by the Reconstruction Finance Corporation). The dried coagulum has a plasticity of 40 when measured on a Mooney plastometer under the usual conditions.

Example 2

Part of the dried coagulum from Example 1 is divided into two parts. Part 1 is compounded in accordance with the following recipe for a cure in accordance with the present invention:

| | Parts |
|---|---|
| Butadiene - methyl - isopropenylketone copolymer | 500 |
| B. L. E. (antioxidant) | 5 |
| Carbon black (easy processing channel) | 225 |
| Hexamethylene tetramine | 10 |
| Salicylic acid | 2.5 |
| Pine tar | 20 |

The above ingredients are masticated together on a rubber mill and the resulting compound sheeted out into slabs, some of which are cured in a suitable mold for various times to obtain the optimum cure time, which was determined to be about seventy-five minutes at about 280° F. Some of the slabs, cured for seventy-five minutes, are cut into test strips which are tested both at room temperature and at 212° F. Other slabs are given a standard A. S. T. M. accelerated aging, and retested.

Part 2 of the coagulum from Example 1 is compounded in accordance with the following formula for a conventional sulfur cure:

| | Parts |
|---|---|
| Butadiene-methyl - isopropenylketone copolymer | 500 |
| Easy processing channel black | 220 |
| B. L. E. (antioxidant) | 5 |
| Zinc oxide | 25 |
| Sulfur | 8.75 |
| Santocure | 6 |
| Softener | 25 |

The ingredients are mixed and optimum cure determined as for part 1 to be forty-five minutes at the same temperature. Some of the more important physical properties of these optimumly cured slabs are shown in the following table.

| | Original | | | | Aged | |
|---|---|---|---|---|---|---|
| | Tensile Strength, lbs./sq. in. | | Percent Elongation | | Tensile Strength, lbs./sq. in., Cold | Elongation, Percent, Cold |
| | Cold | Hot | Cold | Hot | | |
| Hexa | 3,230 | 1,250 | 710 | 480 | 2,740 | 500 |
| Sulfur | 3,220 | 1,000 | 580 | 380 | 1,765 | 275 |

It will be seen from the above table that the tensile strength of the methyl-isopropenylketone copolymer is substantially unaffected by aging treatment and the hot tensile strength is exceptionally high compared to that usually obtained with other polymeric materials. The aged properties are almost equal to the unaged, which is not the case with the sulfur vulcanizate. When the methyl-isopropenylketone in above Example 1 is substituted by other compounds, including methyl vinyl ketone, para-acetylstyrene, and para-acetyl-alpha-methylstyrene, etc., and the respective products cured as in Example 2 with hexamethylene tetramine, etc., vulcanizates having desirable properties are also obtained.

Example 3

A latex prepared as in Example 1 by copolymerizing butadiene and methyl-isopropenylketone in emulsion form was compounded with a fine furnace black (Phil-Black-O) in a proportion of 50 parts of furnace black to each 100 parts of the solid polymeric material. The mixture was coagulated and dried to form a first masterbatch. A second masterbatch was prepared by compounding with the same carbon black a latex made by polymerizing 75 parts of butadiene and 25 parts of methacrolein while maintaining alkaline conditions in an emulsion substantially identical with that of Example 1, except that the methyl-isopropenylketone was substituted by the methacrolein, and coagulating and drying the solids from the resultant latex mixture. The two masterbatches, each of which contains 50 parts of carbon black per 100 parts of polymer, were mixed together in the proportion of 100 parts of the first masterbatch to 50 parts of the second masterbatch. The mixture was blended on a mill and one part of an acid catalyst (benzene sulfonic acid) added. The mixed stock was incorporated in a suitable mold and cured under pressure for 30 minutes at 320° F. The resultant product was definitely cured.

Example 4

A terpolymer comprising 70 parts of butadiene, 21 parts of methyl-isopropenylketone, and 10 parts of methacrolein was prepared by substituting these materials for the monomeric materials of Example 1. The dried coagulum from the resultant latex was mixed with 50 parts of channel black and a small amount (1%) of acid catalyst, such as salicylic acid, toluene sulfonic acid, etc. The stock was placed in a mold and heated for 45 minutes at 300° F. The resultant product was well-cured.

Example 5

When as in Example 4 the methacrolein was substituted by a similar quantity of vinyl pyridine, other conditions remaining substantially the same, a cured product was also surprisingly obtained.

Example 6

When in the last example the methyl-isopropenylketone was substituted by methacrolein so that the copolymer was formed of butadiene, methacrolein and vinyl pyridine, other conditions remaining substantially the same, a cured product was also obtained.

Example 7

| | Parts |
|---|---|
| Dried coagulum from Example 1 | 100 |
| Carbon black (channel black) | 50 |
| Age resistor | 1.5 |
| Paraformaldehyde | 2 |
| Organic acid catalyst (salicylic acid, benzene sulfonic acid, etc.) | 1 to 3 |

The above ingredients were mixed together on a rubber mill with the ingredients being added in any order, as desired, although generally the carbon black is first milled into the polymer. Part of the compounded polymer was cured into cylinders suitable for incorporation in a Goodrich flexometer and part of it was cured into suitable sheets for obtaining standard A. S. T. M. test strips for tensile strength and flexing tests. The cure was accomplished by heating the compounded material in a suitable mold and in a press at about 200° C. and at about 40,000 lbs./sq. in. pressure for one hour. The cured articles had a tensile strength of between 3000 and 3500 lbs./sq. in. The cylinders were flexed in a Goodrich flexometer under standard A. S. T. M. conditions at 212° F. for one hour without a noticeable change in physical properties occurring. After flexing, the cylinders surprisingly had the same size as when they were initially placed in the machine; there was no noticeable permanent set even under such drastic conditions.

Example 8

When cylinders compounded and cured with hexamethylene tetramine as in Example 2 were placed in a Goodrich flexometer and tested under the same conditions as those of Example 4, the sample cracked to some extent in about six minutes, indicating that a portion of the cure with hexamethylene tetramine was not due to the aldehyde mechanism but perhaps to the amine. This illustrates the comparatively unstable cure obtained with amine vs. aldehyde crosslinking. This hexa cure is highly satisfactory for most applications however.

The methyl-isopropenylketone in the above examples may be substituted in whole or in part by the other materials containing the

group as described above. The butadiene in the above examples may be substituted in whole or in part by other conjugated diolefinic compounds including chloroprene, cyanoprene, isoprene, etc. which preferably have less than 8 aliphatic carbon atoms, capable of polymerizing or copolymerizing by the free radical process to produce polymers also curable in the presence of an acidic compound compatible with the polymer together with hexamethylene tetramine and materials which at elevated temperatures have an active aldehyde or active methylenic compound residue. The curing temperature should be sufficient to cause combination or reaction of components of the aforementioned ketone or aldehyde group with nitrogenous base at a reasonable rate, but not destructive to the polymer. It is generally above 200° F. and usually between 300° F. and 450° F., although because of the exceptional aging of the sulfurless polymers even higher temperatures (even 500° F.) may in some cases be used.

As aforementioned, formaldehyde is preferred in accordance with the present invention as the curing agent, for the reason that it is much more active than are other aldehydes and reacts several times as rapidly as does its next higher homologue.

The amount of aldehyde or aldehyde-producing compound required for curing is of course relatively small compared to the amount of polymeric material and generally the cure with formaldehyde is noticeable when the amount of formaldehyde-producing compound is as low as .1% of the weight of the curable polymeric material. Tighter cures are obtained with increasing amounts of formaldehyde, until the amount present is at least .4% or .5% of the weight of the polymeric material. Preferably, however, the amount of aldehyde-liberating compound should be between .5% and 4 or 5% of the weight of the polymeric material. Substantially larger amounts, say even as much as 10%, may of course be present, although such larger amounts are not required.

When the aldehyde is a higher molecular weight aldehyde than formaldehyde, the amount required to accelerate the reaction rate sufficiently for many commercial applications is usually substantially greater than in the case of formaldehyde, although cures may be obtained with the smaller amounts providing the curing time is sufficiently lengthened.

The polymers cured in accordance with the present invention are susceptible to pigmentation with carbon black and other pigments. However, the rate at which curing takes place with formaldehyde is frequently varied by the presence of pigments other than carbon black. Thus, the curing rate of an acidically catalyzed compound prepared in accordance with the present invention is markedly decreased by the presence of zinc oxide. It is also often greatly decreased when the carbon black is substituted by such pigments as the colloidal silica obtainable under the trade name Hi-Sil.

The amount of catalyst used need only be sufficient to maintain the pH at a proper value. In the case of an acid catalyst, the pH should of course be less than 7 and preferably less than 5. Usually, the amount of acidic catalyst required does not appreciably exceed 2% of the weight of the polymeric material, and amounts of about .1% or .2% to 1.5% are usually preferred.

The rubbery copolymers of one or more conjugated diolefinic compounds with one or more of the ketone compounds of the present invention, particularly those copolymers of monomeric mixtures comprising methyl-isopropenylketone and having the methyl-isopropenylketone proportioned to the conjugated diolefin so that the diolefinic compound is 35 to 65% of the total of the two materials, have exceptionally desirable properties for combination with vinyl chloride-containing polymers, such as polyvinyl chloride, the copolymer of vinyl chloride and vinyl acetate, and the copolymer of vinyl chloride with vinylidene chloride. The advantages of this combination are more particularly pointed out in the application of Gerson S. Schaffel and Gilbert H. Swart, Serial No. 162,610, filed May 17, 1950, and assigned to the same assignee as is the present invention.

In accordance with another aspect of the present invention, we have found that certain partially condensed or thermoplastic hydrocarbon substituted phenolaldehyde resins or resin forming materials transform the above-described rubbery copolymers, such for example as the copolymers of methylvinyl or methylisopropenylketone and a conjugated diolefinic compound as prepared in Example 1, from the unvulcanized state to the vulcanized state with considerable rapidity. An acidic material need not be present in the mixture in the case of the novolak resins but is preferred in most cases. The novolak resins which are highly compatible with the rubber, such for example as the condensation products of alkyl substituted phenols and formaldehyde and particularly such condensation products of phenols having 3 or more carbons in the hydrocarbon group as is the case with amylphenol-formaldehyde and octylphenol-formaldehyde condensation products etc. (particularly the acid-catalyzed), will surprisingly vulcanize polymers of a diolefinic compound and methyl-isopropenylketone when present in only relatively small amounts, such as 1% or 2%, or so, to produce vulcanizates having excellent properties. In this connection we are aware of the fact that phenolic resins have been incorporated into rubbery polymers to give a stiffened product, however, a relatively large proportion of the phenolic compound has been required and the stiffening action is considered to be due to the interlocking of the two components or a plasticization of the resin by the rubber. Since in the vulcanization of polymers in accordance with the present invention, only a relatively small amount is required of the phenolic resin it is seen that the mechanism is a true vulcanizing action, chemical action, rather than a mere interlocking of the rubbery polymer with the phenolic resin or a plasticization of the phenolic resins by a rubbery polymer, as is generally had with phenolic rubber mixes heretofore proposed.

The resins or resin forming materials that are highly effective are intermediate or but partial condensation products and those having but very few of the phenol-formaldehyde units say about 1 to around 10 or 20 units are most effective vulcanization agents. The hydrocarbon substituents on the benzene ring, are preferably alkyl groups of 3 to twenty carbon atoms, although phenyl groups are also desirable. The hydrocarbon substituent is preferably in the parapositon and considerably increases the compatibility of the novolak-phenol formaldehyde resin or partial condensation product of phenol and formaldehyde with the polymeric material.

The term "polymer" is here used in the generic sense to include "copolymers." The residues from one molecule of methyl-vinylketone and methyl-isopropenylketone after polymerization with another polymerizable molecule have the general formula

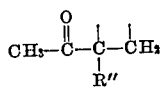

where R" is hydrogen for methyl-vinylketone and methyl in the case of methyl-isopropenylketone and where the free bonds are attached to other molecules of the monomeric materials.

Although the invention may be employed in various ways, only preferred embodiments have been illustrated and described. Other embodiments may be made within the invention as provided by the patent statutes.

What we claim is:

1. A method of curing a copolymer of a conjugated diolefinic compound of less than 9 carbon atoms and a copolymerizable acetyl aryl monoolefinic compound, which copolymer contains at least 40 per cent by weight of diolefinic compound comprising mixing said copolymer with hexamethylene tetramine and a material which provides a pH of less than 7 at curing temperatures and raising the temperature of said mixture to curing temperature and maintaining it at said temperature to cause reaction of said hexamethylene with said copolymer as evidenced by a change in plastic properties of said mix.

2. The process of claim 1 wherein said acetyl aryl olefinic compound is a copolymerizable acetyl alpha-methylstyrene.

3. In a method of curing a solid mass of a rubbery plastic copolymer of at least 40 per cent by weight of a diolefinic compound of less than 9 carbon atoms and of at least 4 per cent by weight of an olefinic ketone copolymerizable therewith, which ketone contains directly connected to the carbonyl group a methyl group, the steps which comprise incorporating into said coplymer hexamethylene tetramine and an acidic catalyst, and thereafter heating the mixture at elevated temperatures to cure it.

4. A continuous phase of a curable solid plastic composition comprising a copolymer of a conjugated diolefinic compound of less than 7 aliphatic carbon atoms, and of an olefinic ketone copolymerizable therewith and having a methyl group attached directly to the carbonyl group thereof, and which contains but one olefinic group, hexamethylene tetramine and an acidic substance capable of providing at curing temperatures a pH of less than 7, said copolymer being characterized by comprising at least 40 per cent by weight of diolefinic compound residues from polymerization thereof, and at least 4 per cent of diolefinic compound by weight thereof of residues from polymerization of said unsaturated ketone.

5. A composition according to claim 4 wherein said unsaturated ketone is an acetyl aryl olefinic compound.

6. A composition according to claim 4 wherein said unsaturated ketone is an acetyl styrene.

7. A composition according to claim 4 wherein said unsaturated ketone is an acetyl alpha-methylstyrene having nuclear positions adjacent the carbon atom carrying the isopropenyl group attached to hydrogen.

8. A cured article prepared according to claim 3.

9. A solid mass of curable plastic linear polymeric composition comprising a solid copolymer of a conjugated diolefinic compound which has up to 9 carbon atoms and which consists solely of atoms selected from carbon, hydrogen, chlorine and nitrogen and of a mono-olefinic material containing the group

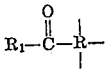

where R' is selected from the group consisting of aryl groups and alkyl groups, and R is always a carbon atom of a hydrocarbon radical and is an aliphatic carbon atom having hydrogen connected directly thereto in all cases where R' contains alpha to the carbonyl group no aliphatic carbon having hydrogen directly attached thereto, the carbonyl group in said mono-olefinic material being linked with a polymerizable olefinic group solely through carbon atoms, and said composition containing a material which at elevated temperatures, not destructive to said polymer, is an aliphatic aldehyde, said composition having a pH of less than 7 at curing temperatures, said copolymer being chemically unsaturated and the total residues in said copolymer of said diolefinic compounds being at least 40% of the weight of said copolymer.

10. The composition of claim 9 wherein a portion of said polymer comprises the residue from the polymerization of an unsaturated olefinic ketone containing a methyl group and a polymerizable olefinic group directly connected to the carbonyl group thereof, said olefinic group being in conjugated relation with said carbonyl group.

11. The composition of claim 9 wherein the aldehyde is formaldehyde.

12. In a method of curing a solid mass of carbon black compounded rubbery copolymer comprising at least 40% of a conjugated diolefinic compound of less than seven aliphatic carbon atoms and a monomeric mono-olefinic compound copolymerizable therewith and containing as an integral component thereof the group having the formula

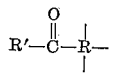

where R' is selected from the group consisting of aryl groups and alkyl groups, and R is always a carbon atom of a hydrocarbon radical and is an aliphatic carbon atom having hydrogen connected directly thereto in all cases where R' contains alpha to the carbonyl group no aliphatic carbon atom having hydrogen directly attached thereto, the carbonyl group in said mono-olefinic material being linked with a polymerizable olefinic group solely through carbon atoms, the steps which comprise forming a mixture by mixing said copolymer with a compound which at elevated temperatures of about 400° F. is an aliphatic aldehyde, said mixture containing a material which provides a pH of less than 7, and thereafter heating the mixture for a sufficient time to cure it, said copolymer having the chemical unsaturation of the residues from polymerization of said diolefinic compounds.

13. In a method of curing a solid mass of rubbery copolymer comprising at least 40% of a conjugated diolefinic compound of less than seven aliphatic carbon atoms and a monomeric olefinic compound copolymerizable therewith and containing as an integral component thereof the group having the formula

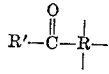

where R' is selected from the group consisting of aryl groups and alkyl groups, and R is a carbon atom of a hydrocarbon radical and is an aliphatic carbon atom having hydrogen connected directly thereto in all cases where R' contains alpha to the carbonyl group no aliphatic carbon atom having hydrogen directly attached thereto, the carbonyl group in said mono-olefinic material being linked with a polymerizable olefinic group solely through carbon atoms, the steps which comprise mixing said copolymer with hexamethylene tetramine in the presence of a material which at elevated curing temperatures provides a pH of less than 7, and thereafter heating the mixture to a temperature between 200° F. and 450° F. to cure it, said copolymer having about one double bond for each residue from the polymerization of said diolefinic compound therein.

14. In a method of curing a solid compounded plastic unsaturated rubbery copolymer of a conjugated diolefin of less than 9 carbon atoms and of an olefinic ketone containing directly connected to the carbonyl group thereof a methyl group and a polymerizable unsaturated group, the steps which comprise incorporating in said copolymer hexamethylene tetramine and an acidic catalyst to catalyze the reaction between an active hydrogen and formaldehyde, and thereafter heating the mixture at elevated temperatures to cure it, said copolymer having at least 40% of residues from said diolefinic compound and at least 4% of residues from said unsaturated ketone.

15. The method of claim 14 wherein the plastic polymer is a copolymer of a conjugated diolefinic compound of less than nine aliphatic carbon atoms and of methyl-isopropenylketone, and wherein the catalyst is an acid substance.

16. In a method of curing a plastic copolymer comprising 40 to 95 per cent of a diolefin of less than 9 carbon atoms and of an olefinic ketone containing directly connected to the carbonyl group thereof a methyl group and a polymerizable unsaturated group, the steps which comprise incorporating in said polymer paraformaldehyde and a substance which at curing temperatures is acid, and thereafter heating the mixture at such elevated temperatures for a sufficient time to convert said polymer from the plastic to the elastic state.

17. The method of claim 16 wherein the plastic copolymer is a rubbery copolymer of a methyl-olefinic ketone and a butadiene-1,3.

18. The method of claim 16 wherein the plastic copolymer is a rubbery copolymer of butadiene-1,3 and methyl-isopropenylketone.

19. A continuous phase of a carbon black containing curable plastic composition comprising (a) at least 40% of a copolymer of a conjugated diolefinic compound of less than seven aliphatic carbon atoms and a monomeric olefinic compound copolymerizable therewith, and containing the group

where R' is selected from the group consisting of aryl groups and alkyl groups, and R is a carbon atom of a hydrocarbon radical and is an aliphatic carbon atom having hydrogen connected directly thereto in all cases where R' contains alpha to the carbonyl group no aliphatic carbon atom having hydrogen directly attached thereto, the carbonyl group in said mono-olefinic material being linked with a polymerizable olefinic group solely through carbon atoms, and (b) at least 4% of hexamethylene tetramine, said composition being further characterized by having at curing temperatures a pH of less than 7.

20. An article comprising a polymeric composition cured in accordance with claim 12.

21. A continuous phase of a carbon black containing curable plastic composition comprising (a) a copolymer of a conjugated diolefinic compound of less than seven aliphatic carbon atoms and a monomeric compound copolymerizable therewith, and containing the group $$R'-\overset{O}{\underset{|}{C}}-\overset{|}{R}-$$

where R' is selected from the group consisting of aryl groups and alkyl groups, and R is a carbon atom of a hydrocarbon radical and is an aliphatic carbon atom having hydrogen connected directly thereto in all cases where R' contains alpha to the carbonyl group no aliphatic carbon atom having hydrogen directly attached thereto, the carbonyl group in said mono-olefinic material being linked with a polymerizable olefinic group solely through carbon atoms, and (b) a formaldehyde-liberating substance, said composition being further characterized by having at curing temperatures a pH of less than 7, said diolefinic compound being present in amounts of at least 50% by weight of said copolymer.

22. A continuous phase of a curable plastic polymeric composition comprising a copolymer of at least 40% of at least one conjugated diolefinic compound of less than 9 carbon atoms with at least 4% of at least one copolymerizable mono-olefinic compound which contains as an integral component thereof the group $$R'-\overset{O}{\underset{|}{C}}-\overset{|}{R}-$$

where R' is selected from the group consisting of aryl groups and alkyl groups, and R is a carbon atom of a hydrocarbon radical and is an aliphatic carbon atom having hydrogen connected directly thereto, in all cases where R' contains alpha to the carbonyl group no aliphatic carbon atom having hydrogen directly attached thereto, the carbonyl group in said mono-olefinic material being linked with a polymerizable olefinic group solely through carbon atoms, and an acid-catalyzed, hydrocarbon substituted phenol-aldehyde condensation product.

23. A continuous phase of a curable plastic polymeric composition comprising a copolymer containing at least 40% of residues from polymerization of at least one conjugated diolefin of less than 9 carbon atoms with at least 4 per cent of residues from polymerization of a mono-olefinic compound copolymerizable therewith and containing as an integral component thereof the group $$R'-\overset{O}{\underset{|}{C}}-\overset{|}{R}-$$

where R' is selected from the group consisting of aryl groups and alkyl groups, and R is a carbon atom of a hydrocarbon radical and is an aliphatic carbon atom having hydrogen connected directly thereto in all cases where R' contains alpha to the carbonyl group no aliphatic carbon atom having hydrogen directly attached thereto, the carbonyl group in said mono-olefinic material being linked with a polymerizable olefinic group solely through carbon atoms, and an acid-catalyzed condensation product of a para-hydrocarbon-substituted phenol and formaldehyde.

24. A continuous phase of a curable plastic polymeric composition comprising a copolymer of 40 to 95 per cent of a conjugated diolefinic compound and of 4 to 30 percent of a mono-olefinic compound which is copolymerizable therewith and which contains as an integral component thereof the group $$R'-\overset{O}{\underset{|}{C}}-\overset{|}{R}-$$

where R' is selected from the group consisting of aryl groups and alkyl groups, and R is a carbon atom of a hydrocarbon radical and is an aliphatic carbon atom having hydrogen connected directly thereto in all cases where R' contains alpha to the carbonyl group no aliphatic carbon atom having hydrogen directly attached thereto, the carbonyl group in said mono-olefinic material being linked with a polymerizable olefinic group solely through carbon atoms, and an acid-catalyzed partial condensation product of a para-tertiary-alkyl phenol and formaldehyde.

GERSON S. SCHAFFEL.
KERMIT V. WEINSTOCK.

References Cited in the file of this patent

UNITED STATES PATENTS

| Number | Name | Date |
|---|---|---|
| 2,088,577 | Conaway | Aug. 3, 1937 |
| 2,386,447 | Dreisbach | Oct. 9, 1945 |
| 2,429,397 | Compton et al. | Oct. 21, 1947 |
| 2,475,273 | Adelson et al. | July 5, 1949 |
| 2,485,239 | Izard | Oct. 18, 1949 |
| 2,495,286 | Brubaker | Jan. 24, 1950 |

FOREIGN PATENTS

| Number | Country | Date |
|---|---|---|
| 595,290 | Great Britain | Dec. 1, 1947 |